April 26, 1949.   G. E. SMITH   2,468,469
HANDLE STRUCTURE FOR PORTABLE TOOLS
Filed Oct. 6, 1945
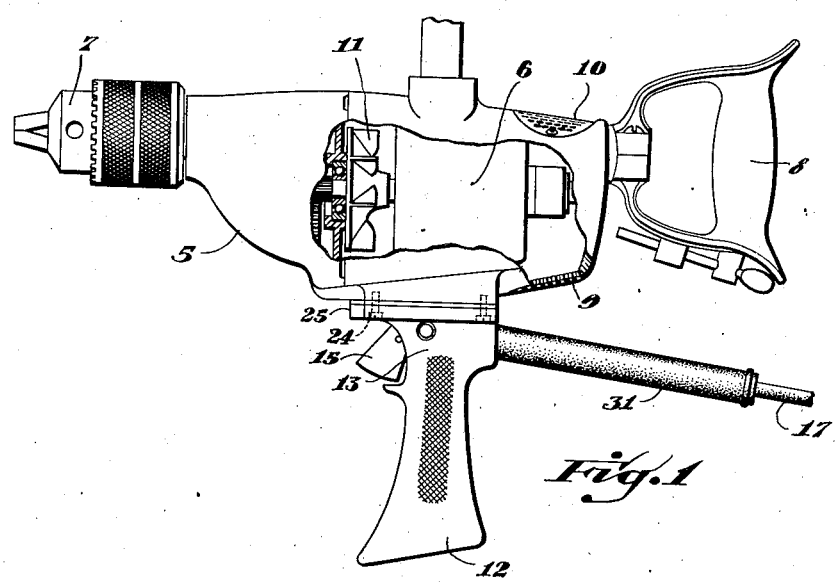
Fig. 1
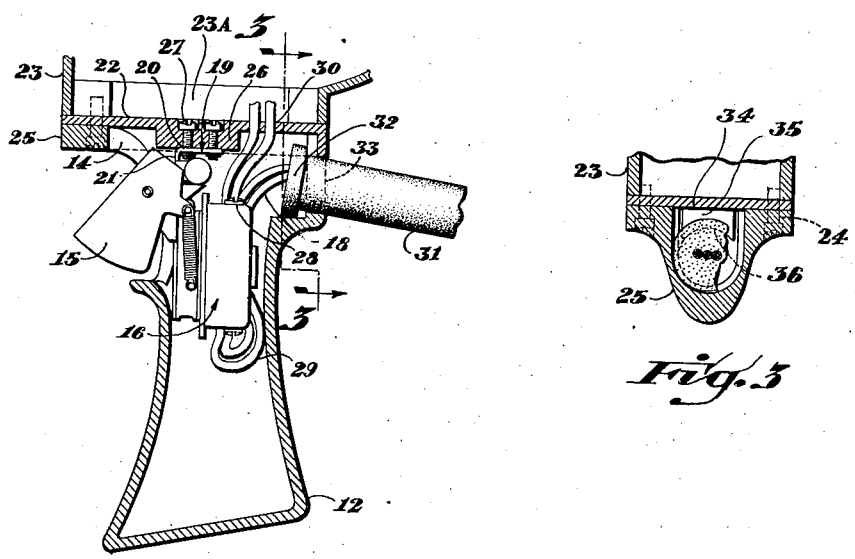
Fig. 2
Fig. 3
INVENTOR.
George E. Smith
BY
Wood, Arey, Herron & Evans Patented Apr. 26, 1949

2,468,469

UNITED STATES PATENT OFFICE 2,468,469

HANDLE STRUCTURE FOR PORTABLE TOOLS

George E. Smith, Fort Mitchell, Ky., assignor to The U. S. Electrical Tool Company, Cincinnati, Ohio, a corporation of Ohio Application October 6, 1945, Serial No. 620,704

8 Claims. (Cl. 172—36)

This invention relates to portable tools of the type driven by means of electric motors. The type of tool concerned herein is inclusive of air-cooling means, consisting of a fan driven by the motor for the purpose of pulling air through ventilating holes into the interior of the casing for cooling the motor. Further, the unit includes a handle element which incorporates the motor control switch.

It has been discovered that a great decrease in efficiency of the cooling function results if the air is drawn into the casing through openings other than the intake openings specifically provided. One of the faults with past tools has been that the fan has drawn the air in through openings at, or around, the handle. The air coming in through these latter openings was not drawn across the motor, and the motor tended to heat up considerably.

The present inventor has provided an improved handle structure wherein the handle, in its relationship to the casing of the unit, blocks any flow of air and makes it necessary that the air enter through the prescribed intake openings. In providing a structure for this purpose, an efficient means has been incorporated for clamping the electric supply cable in position in the handle against easy displacement.

The switch and its operating lever, which may be of the trigger type as shown, are contained within the interior of the handle. A further feature of this invention has been the provision of a readily removable plate which not only functions as a shield or block against the entrance of air, but also as a carrier or support means for the switch elements.

Thus, through the introduction of this shield element, a number of new features have resulted; namely, the blocking of air flow through the handle connection to the casing, secure clamping of the cable, support of the switch elements, and a considerable simplification in the structure of the handle, aiding greatly in the assembling and disassembling operations.

Other objects and advantages will be more fully apparent from a description of the drawing in which:

Figure 1 is a side elevation of an electric motor driven tool of the type described, incorporating the present improvements at the handle.

Figure 2 is a sectional view taken lengthwise through the handle, illustrating the details of the improvement.

Figure 3 is a sectional view taken on line 3—3, Figure 2, illustrating the cable clamping structure.

For an understanding of the present improvements, it will not be necessary to show or describe more than the ventilating or cooling structure of the unit. Thus, detail showing is limited to the handle portion. Referring to the drawing, particularly Figure 1, the casing of the tool is generally indicated at 5. An electric motor 6 is mounted within the casing and drives the chuck 7 through appropriate gearing. A combination breast plate and spade handle 8 is fixed at the rear of the tool.

At the top and bottom of the casing 5, at the rear of the motor, openings 9 are provided. Perforated plates 10 cover these openings, and provide an aggregate opening sufficient for the intake of air for maintaining the motor in cool running condition.

At the front of the motor, on its shaft, an intake fan 11 is mounted for pulling the air into the casing through the intake plates across and through the motor.

Referring to the improved structure, the handle is generally indicated at 12. The handle is shaped to fit the contour of the hand and provides a casing closed with the exception of its upper portion 13 and an opening 14 at its forward upper portion for clearing the switch trigger 15. It is needless herein to go into the detailed structure of the motor control switch 16 and its operating trigger 15. These parts are standard. The cable 17 containing the power leads, enters the rear of the handle and has its leads 18 extended to the switch 16.

The switch 16 and the operating trigger 15 are supported on a bracket 19 which includes generally an attaching leg 20 and a depending leg 21 having the switch and operating trigger mounted thereon in operating relationship. The attaching leg is fastened to a removable plate 22 which provides support for the switch parts. This plate is interposed between the handle element 12 and the base 23 of the tool casing over the opening 23a in the base. Screws 24 pass upwardly through the flange 25 of the handle, through apertures in the plate 22 and into the margin of the opening in the base 23 of the unit, thus clamping the plate firmly between the elements. The attaching leg 20 of the switch carrier bracket is fixed to a boss 26 of the plate 22 by means of screws 27. The switch assembly is thus removable as a unit with the plate through the open upper end of the handle, in disassembling the unit.

The intake leads 18 coming through the cable 17 are secured to terminal screws 28 at the base of the switch. From the control switch, control leads 29 extend up through apertures 30 in the plate 22 to the motor.

At the point of entrance of the cable to the handle of the tool the cable 17 is surrounded by a flexible, preferably molded, strain-relief member 31 which terminates in an annular flange 32 disposed within the handle. This annular flange fits within a recess or socket 33 of U-shaped configuration at the rear of the handle, the recess having an open entrance portion 34 at the top of the handle. Plate 22 has a flange or lip 35 projecting downwardly into the recess through the entrance slot 34, and the depending edge 36 of the lip 35 is of arcuate configuration enabling it to engage the strain relief member at a point adjacent the annular flange thereof, whereby the cable is gripped firmly and held in its socket when the handle 12 is fastened in place. This construction is particularly desirable because it enables the cable terminal to be connected to the switch in the open, whereby the entire assembly may then be inserted into the handle well and cable socket.

The only openings from the handle into the body of the tool are those through which the motor leads pass. These leads fit snugly in the openings; in fact, so much so as to seal them against any possible ventilating flow of air.

Having described my invention, I claim:

1. An improved structure for the type of portable tool incorporating an electric motor, a cooling fan, and a casing structure including air intake openings; comprising, a tubular handle element, switch elements in the handle, a plate fixed between the tubular handle and the casing and supporting the switch elements, electrical leads extending into the handle to the switch and to the motor and means on said plate cooperating with the handle to clamp said electrical leads at the point of entry into the handle.

2. An improved structure for the type of portable tool incorporating an electric motor, a cooling fan, and a casing structure including air intake openings; comprising, a tubular handle element, switch elements in the handle, a plate fixed between the tubular handle and the casing, said plate forming a shield for preventing intake of air through the handle into the casing, and electrical leads extending into the handle to the switch and to the motor, said plate providing means cooperating with the handles to secure said leads at the point of entry into said handle.

3. Handle structure for a portable electric motor driven tool of the type including cooling means within the casing, a hollow handle element secured on the underside of the casing, a closure plate secured between the handle and the casing and carrying switch elements, a cable for electrical leads extending into the handle, and means on the plate cooperating with said handle for clamping the cable in fixed position.

4. Handle structure for a portable electric motor driven tool of the type including cooling means within the casing, a hollow handle element secured on the underside of the casing, and a closure plate secured between the handle and the casing and carrying switch elements for the motor, said plate constituting means for preventing air intake into the casing by way of the handle.

5. Handle structure for a portable electric motor driven tool of the type including cooling means within the casing, a hollow handle element secured on the underside of the casing, a plate secured between the handle and the casing, switch elements in the handle, a cable for electrical control leads extending into the handle to the switch elements, and means on the plate cooperating with said handle for clamping the cable in fixed position.

6. An improved handle structure for an electric motor driven portable tool comprising, a tubular handle, switch elements within the handle, a recess in the handle open to the upper end thereof, said recess including a countersunk portion, a cable having a headed end disposed in the countersunk portion, and a plate secured between the handle and the body of the portable unit including a gripping flange extended into the recess and engaging the cable in back of the head thereof.

7. An improved handle structure for an electric motor driven portable tool comprising a tubular handle, switch elements within the handle, said handle having a recess open to the upper end thereof, a cable extending into the recess, and a plate secured between the handle and the body of the portable unit including a gripping flange extended into the recess and cooperating therewith to provide a clamp for securing the cable to said handle at the point of entry therein.

8. An improved handle structure for a portable tool of the type employing an electric motor, comprising a hollow handle element, switch elements, a cable for electric leads to the switch elements, and a plate carrying the switch elements as a unit, said plate including means cooperating with said handle for gripping the cable and holding it in position in the handle when said plate and handle are assembled.

GEORGE E. SMITH.

REFERENCES CITED

The following references are of record in the file of this patent:

UNITED STATES PATENTS

| Number | Name | Date |
|---|---|---|
| 2,373,842 | Mitchell | Apr. 17, 1945 |
| 2,396,007 | Happe et al. | Nov. 5, 1946 |

FOREIGN PATENTS

| Number | Country | Date |
|---|---|---|
| 100,516 | Switzerland | Aug. 1, 1923 |
| 601,785 | France | Nov. 8, 1926 |